United States Patent

[11] 3,625,359

[72] Inventor Laurence Allan Cross, Jr.
Lambertville, N.J.
[21] Appl. No. 886,302
[22] Filed Dec. 18, 1969
[45] Patented Dec. 7, 1971
[73] Assignee Randomatic Data Systems Inc.

[54] CARD TRANSFER DEVICE FOR INFORMATION RETRIEVAL SYSTEMS
4 Claims, 6 Drawing Figs.

[52] U.S. Cl. .......... 209/80.5
[51] Int. Cl. .......... B07c 3/02
[50] Field of Search .......... 209/80.5, 73, 74, 111.8

[56] References Cited
UNITED STATES PATENTS
3,266,497 8/1966 Bleiman .......... 209/80.5
3,394,247 7/1968 Irasek .......... 209/80.5

*Primary Examiner*—Richard A. Schacher
*Attorney*—Sperry and Zoda

ABSTRACT: A cartridge holding a deck of randomly filed coded cards opens upon an information retrieval station to which a selected card is to be transported. A card selection apparatus selects the wanted card and offsets it from the deck proper. A carrier bar engages the offset card and moves it to the retrieval station where the information on the card is read, photographed, copied or otherwise retrieved. By a return movement of the bar, the card is reinserted in the deck through an entranceway provided in the cartridge for this purpose.

INVENTOR
LAURENCE ALLAN CROSS JR.

BY Sperry and Zoda
ATTORNEYS

INVENTOR
LAURENCE ALLAN CROSS JR.

BY Sperry and Zoda
ATTORNEYS

CARD TRANSFER DEVICE FOR INFORMATION RETRIEVAL SYSTEMS

BACKGROUND OF THE INVENTION

1. Field of the Invention

The invention pertains to the art of retrieving information from a mass of randomly filed, coded cards any one of which can be selected and transported mechanically to a retrieval or readout station and thereafter returned to the file. With particular reference to the subject matter of the claimed invention, the invention pertains to a combination of a cartridge containing a deck of such cards, a card selection apparatus into which the cartridge can be inserted or removed, and a retrieval unit incorporating a carrier means for transporting a selected card to a retrieval station included in said unit, and thereafter returning the card to the file.

2. Description of the Prior Art

The prior art as known to applicant includes card transporting devices, capable of association with card selection mechanisms to transfer a selected card to a reading station. Reference may be had in this respect to U.S. Pat. No. 3,292,631 issued to L. Allan Cross, Jr., one of the joint inventors of the present invention.

In the prior art, however, certain problems to our knowledge have not been solved. In some instances, a card selection apparatus ought to be usable in such a fashion that an operator can manually remove cards selected thereby. In other instances, the same apparatus should permit bodily insertion or removal of cartridges containing decks, whereby the selection equipment can be very compact, containing a magazine area in which a single cartridge can be inserted, from a large library of such cartridges. In still other instances, the apparatus ought to permit the association of a retrieval unit therewith, which unit can be brought into a cooperative relation with an inserted cartridge so as to permit a selected card to be automatically transported to a reading station, where it can be photographed, photocopied, read, electrically sensed, or otherwise handled, and thereafter returned to the cartridge from which it was selected.

In other words, the prior art has not had the complete versatility obviously desirable in apparatus of the type capable of producing selected, coded cards from a randomly filed quantity of such cards. These are the problems which the present invention aims to solve.

SUMMARY OF THE INVENTION

Summarized briefly, the invention can be considered as being a combination of a selection apparatus adapted to select and partially eject a coded card from a quantity of other cards; a removable cartridge containing the cards from which the selection is to be made; and a card transport and reading station. The invention may also be considered as comprising novel constructions of the cartridge and of the transport and reading station, individually. The card selection apparatus, it may be noted, is a separate invention claimed in pending application Ser. No. 438,216 filed Mar. 9, 1965 by L. Allan Cross, Jr., now U.S. Pat. No. 3,486,617. The card selection apparatus, further, includes individual features covered in other patents issued to the same patentee, including U.S. Pat. No. 3,231,186 dated Jan. 25, 1966; U.S. Pat. No. 3,292,631 dated Dec. 20, 1966; U.S. Pat. No. 3,303,492 dated Feb. 7, 1967; and U.S. Pat. No. 3,389,242 dated June 18, 1968.

Described briefly, the invention incorporates a cartridge having spaced card support members extending across its bottom. A deck of cards within the cartridge is supported upon these members, and the cards of the deck have downwardly opening code notches in the spaces between the card support members of the cartridge. A card selection apparatus incorporates a series of selector slides, extending into these spaces. By operation of the apparatus, the slides are selectively moved to cause the selection of a particular card responding to the code impressed upon the apparatus by the operator. The apparatus partially offsets from the deck of cards the selected, wanted card. The invention incorporates a carrier unit, in which a carrier bar engages the offset card and only the offset card, shifting it laterally into engagement with a card guide that will deflect any card extracted from the deck to a retrieval station. Here the card can be read, photographed, or otherwise handled by other equipment not constituting a part of the present invention, but already known in the art. Thereafter, the carrier bar reengages the card, and reinserts it in the cartridge, by moving it into a tapered entranceway of the cartridge.

DESCRIPTION OF THE PREFERRED EMBODIMENT

U.S. Pat. No. 3,292,631 issued to L. Allan Cross, Jr., illustrates a card selection apparatus in which is provided a card retaining area wherein a mass of randomly filed, coded cards is confined. A series of selector slides underlies said cards, and in operation of the apparatus, the impression of a particular code number thereon results in certain of the slides being activated, in a manner such as to select from the mass of cards the particular card responding to the code. The apparatus includes mechanism for ejecting or offsetting the card so selected.

Figure 1:
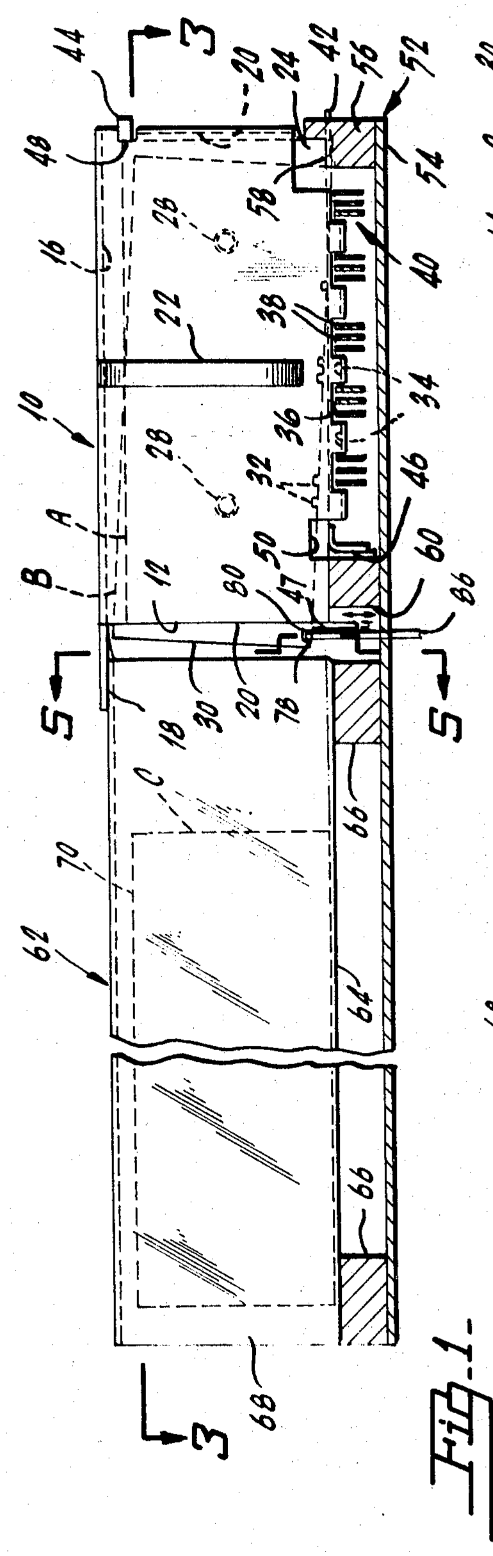
FIG. 1 is a cross-sectional view of a card selection apparatus, showing in side elevation a cartridge and a card carrier and retrieval unit according to the present invention.

Referring now to FIG. 1, a capsule or cartridge generally designated 10 is insertable in the card space of a selection apparatus such as shown in the mentioned patent or in U.S. Pat. No. 3,486,617 issued Dec. 30, 1969 to L. Allan Cross, Jr. The cartridge 10 can be one of a large number of such cartridges, capable of being retained in the library or other storage area, in such fashion that one can select a particular cartridge in which it is known that the wanted card is contained, after which said cartridge can be inserted in the card selection apparatus. Utilizing such an arrangement, the card selection apparatus could actually be relatively compact, and can even be designed to hold a single cartridge readily insertable in or removable from the selection equipment.

In any event, the illustrated cartridge includes sidewalls 12, 14, rigidly connected in transversely spaced relation by a topwall 16. Cartridge 10, at one end, is formed open, and is provided at said end with a hinged gate 18 pivotally supported from the topwall 16, and extending downwardly a short distance over the open end of the cartridge. Gate 18, when the cartridge is to be associated with a retrieval unit of the type shown in FIG. 1, is swung to an upper position as shown in FIG. 1, to overlie the top wall of the adjacent retrieval unit.

Fixedly secured to and extending laterally from the sidewall 12 is a handle 22, whereby the cartridge can be conveniently grasped for insertion in or removal from the selection apparatus.

A pressure plate 24 extends longitudinally of the cartridge in parallel relation to walls 12, 14 thereof, and at the open end of the cartridge has a curved portion 26. Plate 24 is otherwise of a flat construction, and is resiliently, yieldably urged toward wall 14 by compression, coil springs 28.

Confined between wall 14 and plate 24 is a deck of randomly filed cards 30. It may be noted, in this regard, that the pressure of the plate 24 upon the cards is relatively light, so as to facilitate the selection and offsetting of a wanted card responding to a code impressed upon the apparatus by the user. At the same time, however, the cards are effectively maintained in face to face contact, by the pressure exerted thereupon by springs 28.

Defined between the curved portion 26 and the card deck is a tapered entranceway 31. In use of the apparatus, a card which has been selected, extracted, and read is returned to the device by passage into the entranceway 31. There it is deflected by portion 26 of the pressure plate into a path whereby it is inserted between the pressure plate and the card contacted by said plate.

Cards 30 are formed on their bottom edges with code notches 32. Said notches are arranged, preferably, according to a code such as shown in U.S. Pat. No. 3,389,242 issued June 18, 1968. However, other codes can be employed without departure from the present invention.

In any event, notches 32 open downwardly in spaces defined between a series of transverse card support members 34 rigid with and extending between walls 12, 14, in downwardly offset relation to the bottom edges of said walls. By reason of this arrangement, there are defined between adjacent members 34 downwardly opening spaces 36 across which the notched bottom edge portions of the cards are disposed in position to be engaged by selector slides 38 of a card selection apparatus 40 such as shown in copending application Ser. No. 438,216, now U.S. Pat. No. 3,486,617 hereinbefore referred to.

Slides 38 extend upwardly into the spaces 36 as shown in FIG. 1, and are so arranged as to be selectively operated to cause the selection of a particular card the notches of which coincide with the selectively elevated slides. In operation of a card selection apparatus such as described, a laterally shiftable sweeper bar 42 is movable to the left in FIG. 1, following proper positioning of the selected card through utilization of an upper control bar 44, vertical lift bar 46, and lower control bar 47. The tilting of the card that has been selected in the manner described locates it in position to be engaged by the sweeper bar 42, after which the sweeper bar when moved to the left in FIG. 1 will shift the card from its initial position A within the deck to an offset or ejected position B.

It may be noted at this point that in order to assure the proper positioning of the cartridge 10 within the card selection equipment, said equipment has guide means designed to require the exact positioning of the cartridge. Thus, there can be provided a card file loading guide 52 including a base 54 on which is mounted a first support 56 adapted to engage adjacent corners of the card deck and pressure plate 24 and having a right angled recess for this purpose.

Supporting the cartridge adjacent the open end thereof is a support member 60, and it will thus be seen that responsive to insertion of the cartridge in the card space of the selection equipment, it will be automatically positioned for disposal of the cards in proper position to be acted upon by the selector slides 38, sweeper bar 42, lift bar 46, and control bars 44, 47. It may be further noted, in this regard, that the cartridge has a clearance space 48 for the control bar 44, further aiding in proper positioning of the cartridge.

Generally designated at 62 is a card carrier and retrieval unit or assembly, and this as shown can be a self-contained unit or assembly capable, like the cartridge, of being bodily inserted in or removed from the card selection apparatus as desired. When the unit 62 is to be associated with the card selection apparatus for the purpose of automatically transporting a card to a reading station, its support frame 64 can be disposed on supports 66 carried by the base 54. In these circumstances, support frame 64, which is of boxlike, rectangular configuration and is formed with open ends, is disposed in side-by-side relationship to the cartridge, in proper alignment therewith as shown in FIG. 3.

It will be understood, in this regard, that supports 66 and frame 64 can have cooperating aligning pins or recesses, not shown, stops, or any of various other well-known mechanical expedients for effecting proper location of the unit 62 in respect to the cartridge 10.

Sidewalls 68 of the unit 62 are transparent, for the purpose of permitting a reading of the selected card, photographing thereof, or any other handling that may be preferred. The sidewalls are rigidly connected in transversely spaced, parallel relation by a horizontal topwall 70, and extending downwardly from and secured fixedly to the topwall is a card guide member 72. Member 72, as shown in FIG. 3, extends obliquely to the deck of cards 30, across the full width of the deck, and is oblique to the path P in which a selected card is moved while being extracted from the deck 30. As a result, no matter what card is selected, it will move into engagement with guide 72 while it is being removed from the deck, and guide 72 will deflect the card in the direction of the arrows shown in FIG. 3, into a narrow reading space 76 defined between a guide extension 74 formed as an extension of the deflector 72, and disposed in closely spaced, parallel relation to an adjacent wall 68 of the retrieval unit 62.

Figure 3:
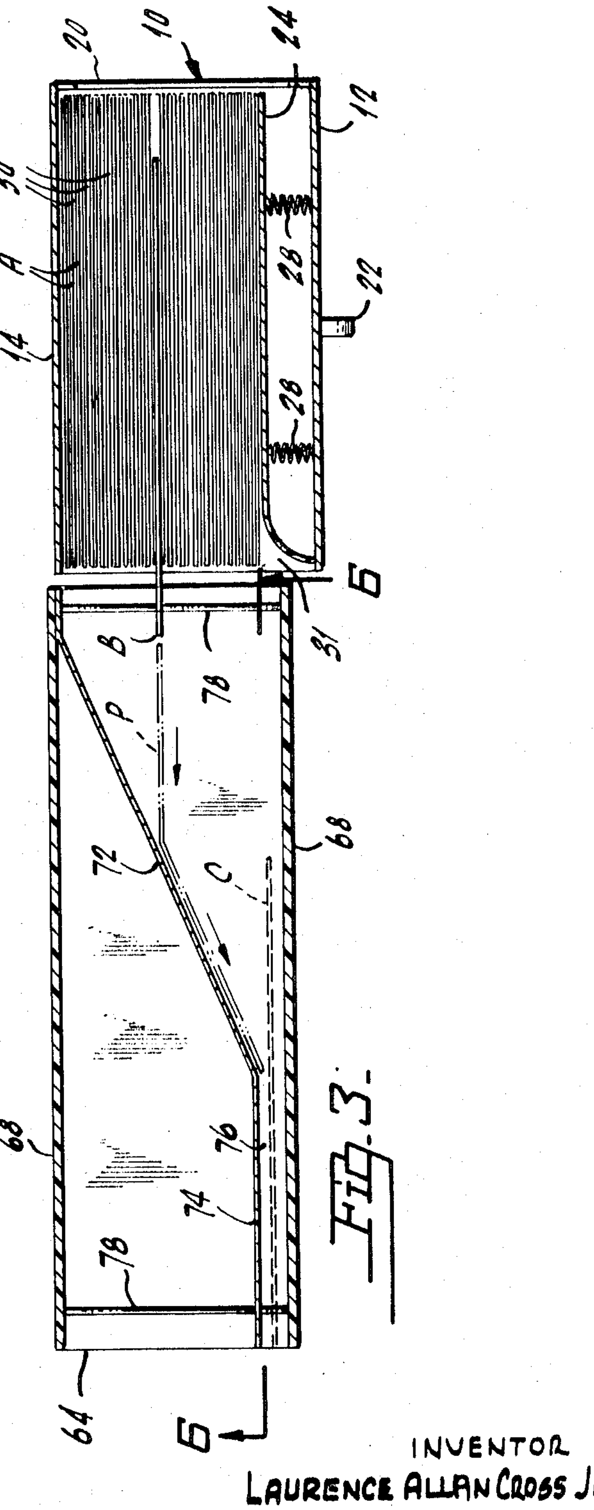
FIG. 3 is a plan sectional view substantially on line 3—3 of FIG. 1.
Figures 2, 4, 5, 6:
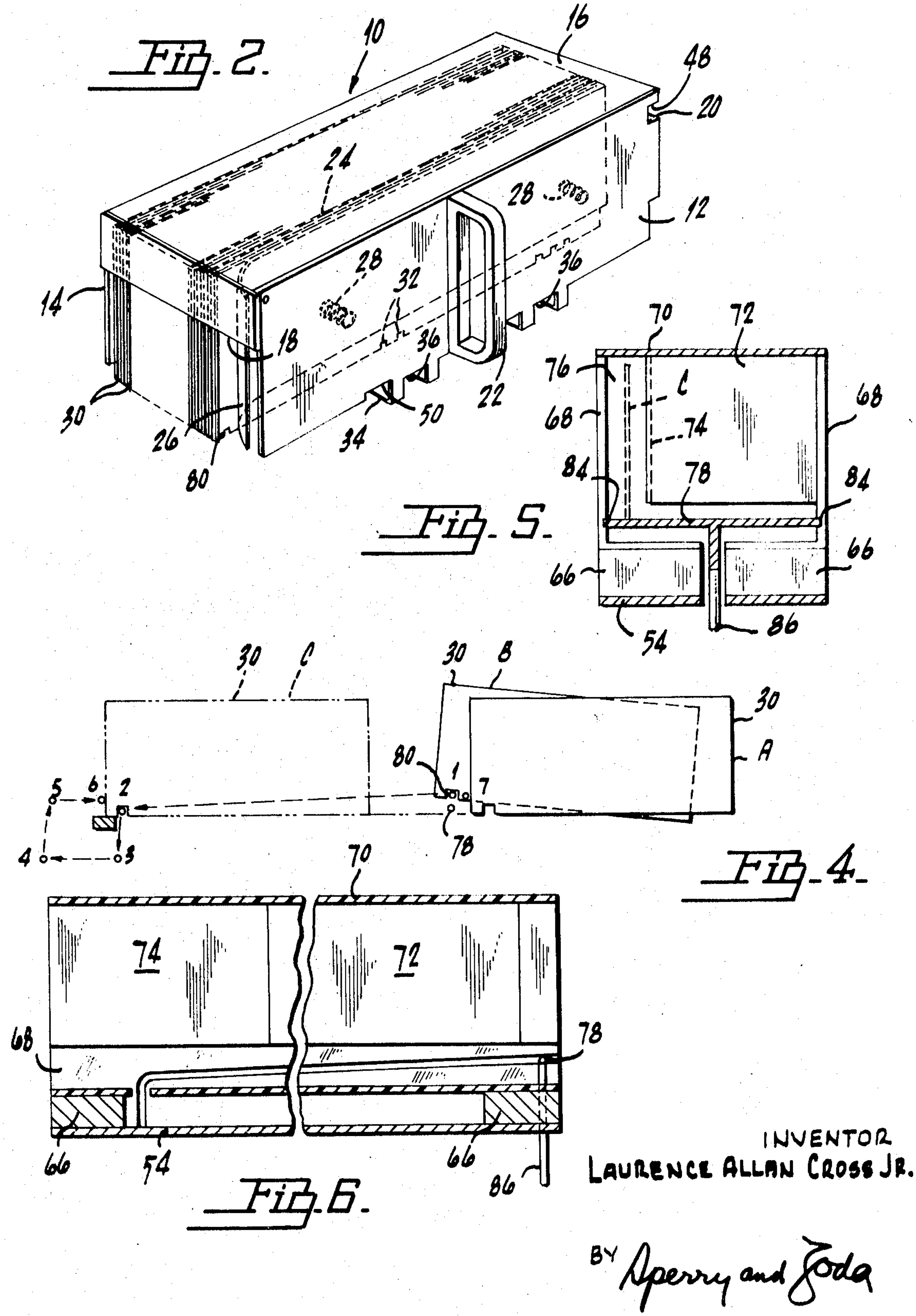
FIG. 2 is a perspective view of the cartridge per se.
FIG. 4 is a schematic view showing the sequence of card positions.
FIG. 5 is a transverse sectional view substantially on line 5—5 of FIG. 1.
FIG. 6 is a longitudinal sectional view through the card carrier and retrieval unit substantially on line 6—6 of FIG. 3.

Thus, initially, the cards are in position A shown in FIG. 3, after which the selected card moves to position B shown in FIGS. 3 and 4. Thereafter, the card so selected is moved to a reading position C, in which it is disposed within the space 76. This space is in alignment with the entranceway 31 of the cartridge as shown in FIG. 3.

For the purpose of moving the selected card from position B to position C, and for the further purpose of reinserting the card in the deck, we provide a card carrier means including a carrier bar 78 extending transversely of the frame 64, normally to the length of the cards and the path P in which the cards are moved when being extracted. Bar 78 is initially in a rest position adjacent the open end of the cartridge, in which position the bar 78 is disposed directly below a downwardly opening carrier notch 80 of the card. Carrier notch 80 defines an abutment, constituted by the vertical sidewall of notch 80 adjacent the end of the card. This abutment is engaged by bar 78 when the bar moves from its rest position to a first operating position thereof designated by the numeral "1" in FIG. 4. With the offset card so engaged by the bar 78, the bar is now moved longitudinally of the frame 64 within the lower portion of said frame, clearing the bottom edge of the deflector 72 and deflector extension 74, to a position "2." In this position of the bar 78, the selected card has been carried to its reading position C. At this point, it may be observed that when the card is in its reading position, any operation can be performed thereon that may be desired. Possibly, the card may have thereon microfilmed material which can be photographed, enlarged, and printed out. Or the information on the card may be in the form of coded apertures, which can be sensed electronically or photographically, and the resultant information transmitted elsewhere. Then again, the card may simply be read by a viewer, either directly or by utilizing a projected, enlarged image of the information provided upon the card. Still further, the information on the card can be sensed by photocopying equipment, which would automatically photograph and photocopy the intelligence provided upon the card making any desired number of photocopies.

In any event, when the card reaches the position C, the carrier bar 78 drops out of the notch 80, moving downwardly to position "3", and thereafter horizontally to position "4." Then, the bar moves up to position "5," and now travels in a reverse direction to position "6." In this position, the bar engages the end of the card, and upon movement of the bar to a position "7" the reinsertion of the card in the deck is brought about. It will be observed, in this regard, that the card moves directly from position C in a straight line into the entranceway 31 aligned with space 76, and in this way is guided back into the deck awaiting the next cycle of operation of the device.

For the purpose of moving the carrier bar from its starting position to its position "7" and back to its starting position, we provide, in the inner surfaces of walls 68, endless cam tracks or grooves 84. The carrier bar, at its opposite ends, is slidably engaged in said cam tracks. Extending downwardly from the bar 78, medially between the opposite ends thereof, is a carrier bar support arm 86, which would be connected to any suitable means for imparting reciprocating movement to said arm. Thus, when a card 30 has been moved to an offset position, the operator of the device can switch on the mechanism for moving the arm 86 through a single back-and-forth stroke. This will cause the carrier bar 78 to move from its start position through the above described cycle thereof and back to its start position at the conclusion of said stroke of the actuating arm connected thereto.

Of course, it is also possible to utilize an automatic means for imparting said movement to the actuating arm When when a card 30 is moved from position A to position B, it can obviously operate a microswitch or the like, not shown, which would turn on the mechanism whereby arm 86 is caused to travel through a single reciprocating stroke to cause the back-and-forth travel of the carrier bar 78 within its cam track, from its starting position, through positions "1" to "7" and back to its starting position.

It will be noted that the construction of the cartridge 10, and of the card carrier and reading unit, is such as to permit the cartridge and said unit to be swiftly inserted in or removed from the card selection apparatus 40. Apparatus 40, thus, can be used in a normal fashion without the reader unit or without insertion of cartridges, and is adapted to hold a quantity of cards that are not separated into decks confined in individual cartridges. Yet, without modification of the apparatus 40, one can utilize it to receive cartridges 10, and one can further either remove selected cards manually from the cartridges, or alternatively, can associate with the cartridge the described carrier and retrieval unit 62. In this way, a versatility is achieved, not present in ordinary card selection devices of this type. The final result is to adapt such a card selection apparatus for automatic selection of a randomly filed, wanted card, automatic movement of said card to a reading position, and the automatic photographing, reproduction, or transmission of the intelligence carried by the card.

I claim:

1. A card selection and information retrieval device comprising:
   a. means for supporting a card deck;
   b. means to select and offset from said deck a card bearing information to be retrieved; and
   c. card carrier and retrieval means including a movable carrier element and a retrieval station spaced forwardly from said deck support means, said element perpendicularly intersecting the planes of the several cards of the deck over the full-width of the deck, said element being engageable only with an offset card and being movable with the card so engaged in a path extending between the deck support means and said station, said card initially being moved in its own plane straight forwardly from the deck support means, said element being movable with the engaged card through substantially the full-distance between the deck support means and the retrieval station, and a card guide member stationarily mounted between the deck support means and said station in the path of the moving carrier element, said member obliquely intersecting the planes of all the cards in the deck over the full-width of the deck, in position to deflect and guide to said station any selected card while the same is engaged with and is being transported to the retrieval station by the carrier element, the deflected card shifting transversely of the deck along the length of the carrier element while remaining in engagement therewith during the further movement of the card to the retrieval station.

2. A card selection and information retrieval device as in claim 1 wherein each card has an abutment exposed in the offset position thereof, said carrier element being movable from a rest position into engagement with said abutment, thence along said path in a direction away from the deck to said station, and thereafter in a reverse direction in engagement with the card to return the card to the deck.

3. A card selection and information retrieval device comprising:
   a. means for supporting a card deck;
   b. means to select and offset from said deck a card bearing information to be retrieved; and
   c. card carrier and retrieval means including a movable carrier element and a retrieval station, said element being engageable only with an offset card and being movable with the card so engaged in a path extending between the deck and said station, said card having an abutment exposed in the offset position thereof, said carrier element being movable from a rest position into engagement with said abutment, thence along said path in a direction away from the deck to said station, and thereafter in a reverse direction to return the card to the deck, said carrier element, at the information retrieval station, being movable out of engagement with said abutment and into engagement with an end of the card preliminary to movement of the carrier element in said reverse direction.

4. A card selection and information retrieval device comprising:
   a. a boxlike cartridge for a deck of randomly filed cards having code notches in their bottom edges, said cartridge being formed open at least at its bottom and one end and including an entranceway for cards returned to the deck after selection and transportation to an information retrieval station, said cartridge including spaced card supports extending across the open bottom thereof, said cards further having abutments adjacent one end thereof;
   b. means to select a card from those in the deck, including
      1. a series of selector slides selectively extendable into the spaces between said supports and operable to card selecting positions in engagement with corresponding notches to select a wanted card, and 2. a sweeper bar for offsetting the wanted card from the remaining cards of the deck to a position in which said abutment of the card is exposed; and
   c. a card carrier and information retrieval means including
      1. a support frame mounted in juxtaposition with the cartridge and having one end opening into communication with the open end of the cartridge,
      2. A card guide extending across said frame obliquely to said deck to deflect to one side of the frame any card removed and shifted laterally from the deck, said frame having an information retrieval station at said side thereof aligned with the entranceway of the cartridge, and
      3. a carrier bar mounted on the frame for movement between the ends thereof and disposed to engage the abutment of the selected, offset card so as to carry the card to the guide and thereby to said station, said carrier bar being movable in a reverse direction in engagement with the card to move the card through the entranceway and thus reinsert it in the deck.

* * * * *